(12) United States Patent
Muranaka et al.

(10) Patent No.: US 7,434,673 B2
(45) Date of Patent: Oct. 14, 2008

(54) WET FRICTION MATERIAL

(75) Inventors: Takuya Muranaka, Aichi-ken (JP); Takatora Sugiura, Toyota (JP); Masato Suzuki, Toyota (JP)

(73) Assignee: Aisin Kako Kabushiki Kaisha, Aichi (JP)

( * ) Notice: Subject to any disclaimer, the term of this patent is extended or adjusted under 35 U.S.C. 154(b) by 84 days.

(21) Appl. No.: 11/090,893

(22) Filed: Mar. 28, 2005

(65) Prior Publication Data

US 2005/0217965 A1   Oct. 6, 2005

(30) Foreign Application Priority Data

Mar. 29, 2004 (JP) ............... 2004-094474

(51) Int. Cl.
  *F16D 13/72* (2006.01)
  *F16D 13/64* (2006.01)
(52) U.S. Cl. ............... 192/113.36; 192/107 R
(58) Field of Classification Search .......... None
  See application file for complete search history.

(56) References Cited

U.S. PATENT DOCUMENTS

| 4,674,616 | A | * | 6/1987 | Mannino, Jr. | ........... 192/107 R |
| 5,094,331 | A | * | 3/1992 | Fujimoto et al. | ......... 192/70.12 |
| 6,035,991 | A | * | 3/2000 | Willwerth et al. | ........ 192/107 R |
| 6,062,367 | A | * | 5/2000 | Hirayanagi et al. | ..... 192/107 R |
| 6,283,265 | B1 | * | 9/2001 | Hirayanagi et al. | ...... 192/70.12 |
| 6,409,006 | B1 | * | 6/2002 | Wakamori et al. | ....... 192/107 R |
| 6,499,579 | B2 | * | 12/2002 | Ono et al. | .............. 192/113.36 |
| 6,702,088 | B2 | | 3/2004 | Kitaori et al. | |
| 2001/0023803 | A1 | * | 9/2001 | Hattori | .................... 192/70.12 |
| 2005/0217965 | A1 | | 10/2005 | Muranaka et al. | |
| 2006/0090979 | A1 | * | 5/2006 | Asai et al. | ................ 192/107 R |

FOREIGN PATENT DOCUMENTS

JP   2002-340071   11/2002

* cited by examiner

*Primary Examiner*—Rodney H Bonck
(74) *Attorney, Agent, or Firm*—Westerman, Hattori, Daniels & Adrian, LLP.

(57) ABSTRACT

In a segment-type wet friction material, an inner peripheral left corner of one segment piece and an inner peripheral right corner of another segment piece are respectively cut off at a fixed angle to a center line of an oil groove. The oil grooves have first oil grooves and second oil grooves. The second oil groove has nearly a uniform width. The first oil groove has an inner peripheral corner portion that is broadened to the center line of the oil groove from a fixed height. In case of being assembled in an automatic transmission, when the segment-type friction material rotates in one direction, an automatic transmission fluid supplied from an inner circumference bumps and touches the portion that is broadened at the fixed angle at a rear side in the rotating direction.

10 Claims, 5 Drawing Sheets

Rotating Direction of Friction Material

WET FRICTION MATERIAL

BACKGROUND OF THE INVENTION

1. Field of the Invention

This invention relates to a wet friction material that generates a torque by applying a high pressure to an opposite surface while being immersed in an oil. In detail, this invention relates to a segment-type friction material made by joining friction material substrates that were cut into a segment piece onto one or both of opposite surfaces of a core metal of a flat ring shape along an entire circumference thereof with an adhesive. Otherwise, this invention relates to a press-type friction material made by pressing one or both of opposite surfaces of a friction material that has friction material substrates joined onto one or both of opposite surfaces of a core metal of a flat ring shape along an entire circumference thereof with an adhesive so as to form a plurality of oil grooves in a radial direction.

2. Description of the Related Art

In recent years, a segment-type friction material 21 as shown in FIG. 11 is under development as a wet friction material in order to improve material yield with resultant cost reduction and to lessen drag torque with resultant high fuel efficiency. FIG. 11 illustrates a plan view of a partial structure of a conventional segment-type friction material. As shown in FIG. 11, the segment-type friction material 21 has a core metal 2 of a flat ring shape and friction material substrates 23. The friction material substrates 23 are cut into a segment piece corresponding to and arranged along the flat ring shape. A set of the segment-piece-shaped friction material substrates 23 are arranged and joined with an adhesive on a front surface of the core metal 2 side by side along an entire circumference of the core metal 2 with a gap to be an oil groove 26. Another set of the segment-piece-shaped substrates 23 are joined with the adhesive to a rear surface of the core metal 2, too. Such segment-type friction material 21 is applicable to a friction material clutch device that has a single or plural friction plates and that is used in an automatic transmission, which may be referred to as "AT" hereafter, of automobiles or motorcycles or the like.

As an example, a wet hydraulic clutch is used for an automatic transmission of an automobile or the like. The wet hydraulic clutch has a plurality of segment-type friction materials and a plurality of separator plates laid alternately on each other. Then, both the plates are contacted with a hydraulic pressure to transmit a torque. A lubricating oil or an automatic transmission fluid, which may be referred to as "ATF" hereafter, is supplied to between both the plates for the purpose of absorbing a frictional heat generated when they are shifted from a disengaged state to an engaged state or preventing abrasion or the like. However, a distance between the segment-type friction material and the separator plate is set small in order to increase response of the hydraulic clutch. Moreover, a total area of an oil passage provided on the segment-type friction material is restricted in order to assure a sufficient torque transmission capacity at the time of clutching operation of the hydraulic clutch. Consequently, it is hard to discharge the lubricating oil remaining between the segment-type friction material and the separator plate at the time of clutching operation of the hydraulic clutch. As a result, there was a problem that a drag torque was generated by the hydraulic oil caused by a relative rotation of both the plates.

In view of the above, according to an invention described in Japanese Laid Open Patent Publication No. 2002-340071, a wet friction plate as a segment-type friction material has two-tiered segment pieces arranged at an inner circumference and an outer circumference thereof. At least part of an inner peripheral edge of the segment piece is inclined outwardly in a radial direction toward a radial inner end of a radially extending oil passage that faces a lagging side in a rotating direction. Thus, in the technique of 2002-340071, it is intended to lead the lubricating oil effectively to the radial inner end of the radially extending oil passage.

However, in the technique described in the above patent publication No. 2002-340071, the radially extending oil passage is narrow and extends with a same width. In contrast, a test was conducted to show a relation between a groove width ratio (a/b) of an outer opening "a" and an inner opening "b" of the radially extending oil passage and a drag torque reduction rate in the conventional wet friction material 21 shown in FIG. 11. Then, it was confirmed that the wet friction material only had a torque reduction rate of about 30% in case the groove width ratio (a/b) equaled 1.0 or the oil passage extended with a same width. That is, the wet friction material only had a half effect of the case where the groove width ratio (a/b) equaled 3.0 or 4.0. Moreover, in the technique described in the patent publication No. 2002-340071, the segment pieces cut into small pieces are joined with an adhesive in two tiers at the inner circumference and the outer circumference. Therefore, there is a problem that the drag torque is not reduced enough by the lubricating oil, though it involves effort to produce and increases costs.

BRIEF SUMMARY OF THE INVENTION

An object of the present invention is to provide a wet friction material that reduces a drag torque sufficiently even at a portion where a lubricating oil remains in a great quantity and is hard to be discharged and that can be manufactured in a short period of time so as to lower costs.

According to a first aspect of the invention, there is provided a segment-type wet friction material comprising: a core metal of a flat ring plate shape; and segment pieces made of friction material substrates cut into a segment piece shape along a circumference of the flat ring plate shape of the core metal. The segment pieces are joined on at least one surface of the core metal with an adhesive along the entire circumference of the core metal so that a plurality of oil grooves extending in a radial direction of the core metal are formed by a clearance between adjacent ones of the segment pieces. The plurality of the oil grooves are composed of first oil grooves and second oil grooves. Each of the first oil grooves has a symmetrical broadened portion at one of an inner peripheral opening portion and a center portion thereof in the radial direction of the core metal. Each of the second grooves has nearly a uniform width from an inner peripheral opening portion to an outer peripheral opening portion. The first grooves and the second grooves are mixedly disposed in a predetermined proportion.

It is preferable that the first oil grooves and the second oil grooves are mixedly disposed in a proportion within a range of 20%:80% to 80%:20% as the predetermined proportion.

It is preferable that the first oil grooves and the second oil grooves are alternately disposed in a proportion within 50% to 50% as the predetermined proportion. That is, the first oil grooves and the second oil grooves may be provided one to one or in the same number and alternately disposed.

The symmetrical broadened portion of the first oil groove may be formed by a pair of oblique lines located at the inner peripheral opening portion so as to be symmetrically broadened and inclined at a constant angle to a center line of the first oil groove.

It is preferable that the constant angle is within a range of 20 to 70 degrees.

It is preferable that the constant angle is about 45 degrees. In this case, if the first oil grooves and the second oil grooves are provided in the same number and alternately disposed, the largest drag torque reduction effect is obtained.

It is preferable that a proportion of a height of the symmetrical broadened portion of the first oil groove to a total height of the first oil groove is within a range of 10% to 70%.

It is preferable that a proportion of the height of the symmetrical broadened portion of the first oil groove to the total height of the first oil groove is about 30%. In this case, if the first oil grooves and the second oil grooves are provided in the same number and alternately disposed, the largest drag torque reduction effect is obtained.

The symmetrical broadened portion of the first oil groove may be formed by a pair of arcs located at the inner peripheral opening portion so as to be symmetrically broadened to a center line of the first oil groove.

The symmetrical broadened portion of the first oil groove may be formed by a pair of dents located at the center portion so as to be symmetrically broadened to a center line of the first oil groove.

A press-type wet friction material according to claim 1 in which the symmetrical broadened portion of the first oil groove is formed by a pair of rectangular portions located at the inner peripheral opening portion so as to be symmetrically broadened to a center line of the first oil groove.

The symmetrical broadened portion of the first oil groove may be formed by a pair of semi-ovals located at the inner peripheral opening portion so as to be symmetrically broadened to a center line of the first oil groove, each of the semi-ovals extending at an angle to the center line of the first oil groove.

The symmetrical broadened portion of the first oil groove may be formed by a pair of rectangular portions located at the center portion so as to be symmetrically broadened to a center line of the first oil groove.

According to a second aspect of the invention, there is provided a press-type wet friction material comprising: a core metal of a flat ring plate shape; and a friction material substrate joined on at least one surface of the core metal with an adhesive along an entire circumference of the core metal. The friction material substrate is pressed so that a plurality of oil grooves extending in a radial direction of the core metal are formed. The plurality of the oil grooves are composed of first oil grooves and second oil grooves. Each of the first oil grooves has a symmetrical broadened portion at one of an inner peripheral opening portion and a center portion thereof in the radial direction of the core metal. Each of the second grooves has nearly a uniform width from an inner peripheral opening portion to an outer peripheral opening portion. The first grooves and the second grooves are mixedly disposed in a predetermined proportion.

In case of the segment-type friction material, the segment piece may be a large one with a large width (radial size) corresponding to an entire width of the ring shape portion of the core metal and a large length (circumferential size). In this case, the number of the segment pieces can be reduced, so that a time for cutting off and joining of the segment pieces is shortened and the costs can be reduced. On the other hand, the press-type friction material can be manufactured only by joining the friction material substrate on one or both surfaces of the ring shape portion of the core metal and pressing it from one or both sides. Therefore, it is suitable for mass-production, thereby reducing the costs.

Further objects and advantages of the invention will be apparent from the following description, reference being had to the accompanying drawings, wherein preferred embodiments of the invention are clearly shown.

DETAILED DESCRIPTION OF THE INVENTION

Figure 1:
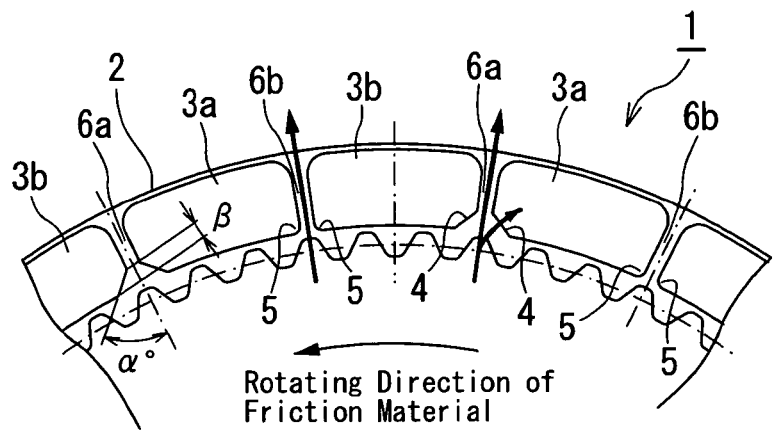
FIG. 1 is a plan view showing a part of a wet friction material according to a first embodiment of the invention.

Preferred embodiments of the invention are described hereafter referring to the drawings. While the embodiments of the invention are described mainly as a segment-type friction material among wet friction materials, same function and effect are obtained in case of a press-type friction material.

FIRST EMBODIMENT

Figure 2:
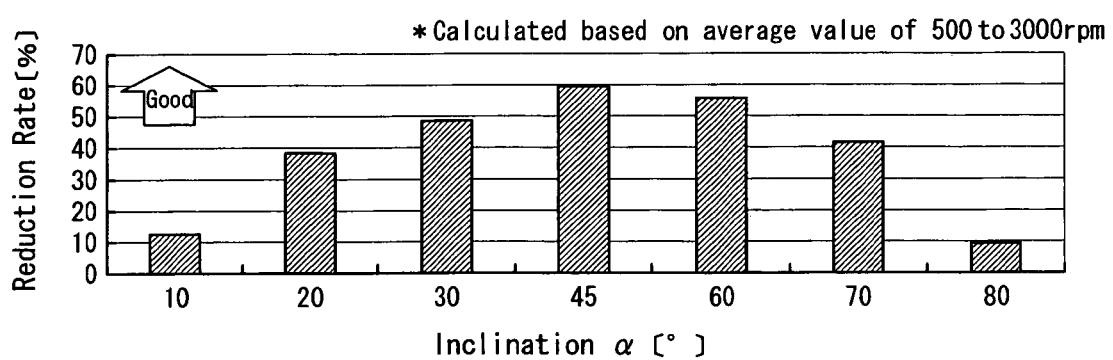
FIG. 2 is a graph showing a relation between an inclination angle of an inner peripheral corner of an oil groove and a drag torque reduction rate in the wet friction material according to the first embodiment of the invention.
Figure 3:
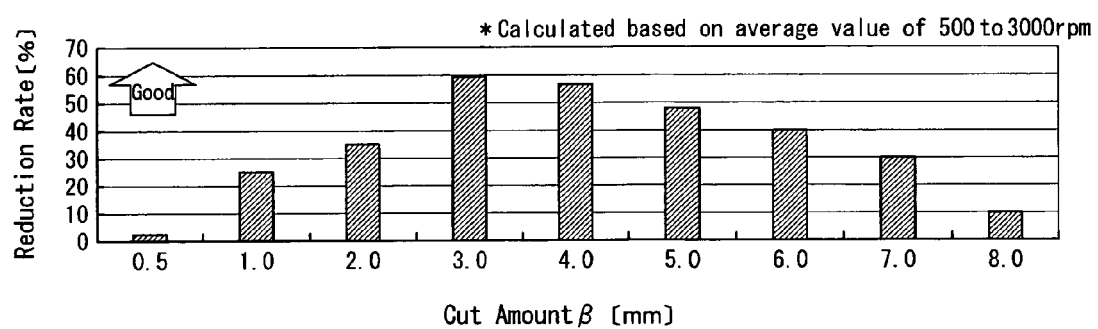
FIG. 3 is a graph showing a relation between a height of an inclined part of the inner peripheral corner of the oil groove and the drag torque reduction rate in the wet friction material according to the first embodiment of the invention.
Figure 4:
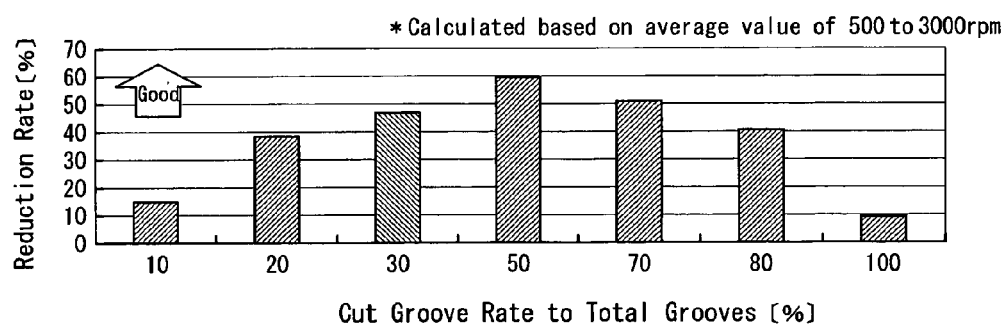
FIG. 4 is a graph showing a relation between a proportion of a number of the oil grooves with the inclined inner peripheral corner to a total number of all the oil grooves and the drag torque reduction rate in the wet friction material according to the first embodiment of the invention.
Figure 5:
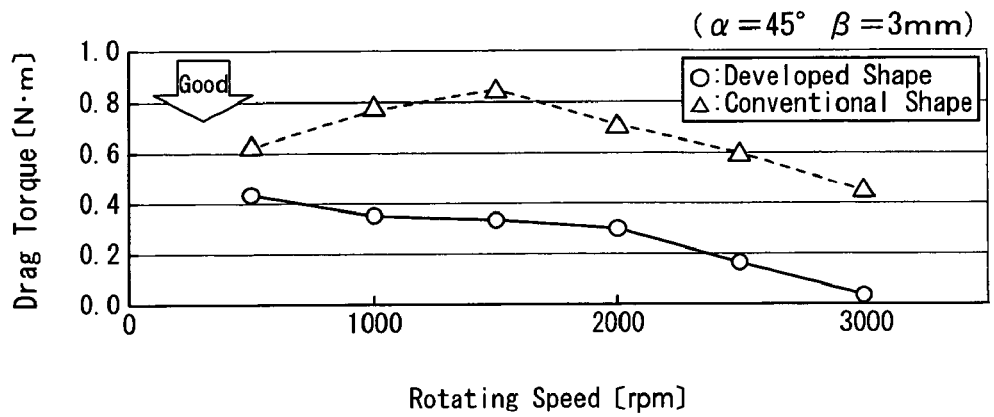
FIG. 5 is a graph showing a relation between a rotating speed and a drag torque in the wet friction material according to the first embodiment of the invention, while compared with a conventional wet friction material.

A first embodiment of a wet friction material is described referring to FIG. 1 to FIG. 5. FIG. 1 is a plan view showing a part of a wet friction material according to a first embodiment of the invention. FIG. 2 is a graph showing a relation between an inclination angle of an inner peripheral corner of an oil groove and a drag torque reduction rate in the wet friction material according to the first embodiment of the invention. FIG. 3 is a graph showing a relation between a height of an inclined part of the inner peripheral corner of the oil groove and the drag torque reduction rate in the wet friction material according to the first embodiment of the invention. FIG. 4 is a graph showing a relation between a proportion of a number of the oil grooves with the inclined inner peripheral corner to a total number of all the oil grooves and the drag torque reduction rate in the wet friction material according to the first embodiment of the invention. FIG. 5 is a graph showing a relation between a rotating speed and a drag torque in the wet friction material according to the first embodiment of the invention, while compared with a conventional wet friction material.

As shown in FIG. 1, a segment-type friction material 1 as a wet friction material of the first embodiment is made by joining a plurality of segment pieces 3a, 3b on a front surface of a core metal 2 of a flat ring shape with a thermosetting resin adhesive while arranging them at an interval of an oil groove 6b. A plurality of the segment pieces 3a, 3b are joined on a rear surface of the core metal 2 in the same manner, too. An inner peripheral left corner of the segment piece 3a and an inner peripheral right corner of the segment piece 3b are respectively cut off at an angle α to a center line of an oil groove 6a. Such corners constitute cut portions 4 and face to each other so as to form an inner peripheral broad portion. The segment pieces 3a, 3b are heat-pressed from opposite sides of the core metal 2 at 230° C. to 250° C. for 30 to 90 seconds so as to be secured on the core metal 2, thereby making the segment-type friction material 1 as a finished product.

In the segment-type friction material 1, an inner peripheral right corner 5 of the segment piece 3a and an inner peripheral left corner 5 of the segment piece 3b are not cut off so that the oil groove 6b is formed to be an oil groove having a nearly uniform width. In contrast, the oil groove 6a becomes a wide oil groove having the inner peripheral corner portion 4 inclined or broadened at the angle α relative to the center line of the oil groove from a position of a height βmm. As shown in FIG. 1, the oil grooves 6a and the oil grooves 6b are disposed alternately in the same number. In case the segment-type friction material 1 is assembled in an automatic transmission (AT), when the friction material 1 rotates in an arrow direction in a disengaged state, an automatic transmission fluid (ATF) supplied from an inner circumference bumps or touches the portion 4 of the segment piece 3a that is broadened at the angle α at a rear side in the rotating direction. Thus, as shown by diverged arrows in FIG. 1, ATF is positively supplied to a friction surface of the friction material substrate 3a so as to restrain contact of a separator plate and the friction surface, while an excess ATF is discharged from the oil groove 6b having nearly the same width.

As described above, in the first embodiment, the segment pieces 3a, 3b are made of friction material substrates cut into the segment piece shape along the circumference of the flat ring plate shape of the core metal 2. The segment pieces 3a, 3b are joined on opposite surfaces or at least one surface (front surface) of the core metal 2 with an adhesive along the entire circumference of the core metal 2. A plurality of the radially extending oil grooves 6a, 6b are formed by a clearance between adjacent ones of the segment pieces 3a, 3b. The oil grooves 6b constitute first oil grooves and the oil grooves 6a constitute second oil grooves. Each of the first oil grooves 6b has the cut portion or the inner peripheral broadened portion 4 as a symmetrical broadened portion at the inner peripheral opening portion in the radial direction of the core metal 2. Each of the second grooves 6a has nearly the uniform width from the inner peripheral opening portion to the outer peripheral opening portion. The symmetrical broadened portion 4 of the first oil groove 6b is formed by a pair of oblique lines of a right-angle triangle located at the inner peripheral opening portion so as to be symmetrically broadened and inclined at the constant angle α to the center line of the first oil groove 6b.

Consequently, it is possible to obtain a significant drag torque suppressing effect. In case the segment-type friction material 1 is idly rotated in the reversed direction, the portion 4 of the segment piece 3b that is broadened at an opposite side to that of the segment piece 3a acts similarly.

Test Results

In order to obtain a larger drag torque suppressing effect, an experiment was carried out to get optimal values, respectively, of three parameters in the first embodiment of the segment-type friction material 1: the inclination angle α, the height β and a proportion of the oil grooves 6a that have the broadened portions at the inner periphery. Bar graphs of FIG. 2 to FIG. 4 show their results.

First, in order to obtain an optimal value of the inclination angle α, there were prepared seven samples having different inclination angles α, while fixing the height β at 3 mm and the proportion of the oil grooves 6a having the inner peripheral broadened portion at 50%. The segment piece 3a, 3b has a height or a vertical length of 10 mm, so that the height β=3 mm is 30% in proportion. Then, the seven samples were assembled respectively in an actual AT and a drag torque reduction rate was measured for each of the samples. The drag torque reduction rate was expressed as an average value of six points of measurement values that are measured at every 500 rpm while increasing the rotating speed of the segment-type friction material 1 gradually from 500 rpm to 3000 rpm.

As a result, as shown in FIG. 2, in case the inclination angle α is 10 degrees, the drag torque reduction rate is low such as about 12%. However, if the angle becomes 20 degrees, the rate jumps up to nearly 40%. Thereafter, if the inclination angle α increases, the rate increases. If the inclination angle α is 45 degrees, the drag torque reduction rate becomes a largest value of about 60%. Thereafter, if the inclination angle α increases, the rate decreases. In case the inclination angle α is 70 degrees, the drag torque reduction rate is still kept at 40% or more. However, if the inclination angle α becomes 80 degrees, the rate immediately drops to 10% or less. Accordingly, in conclusion, if the inclination angle α is kept within a range of 20 to 70 degrees, a significant drag torque reduction effect is obtained. Particularly, if the inclination angle α is 45 degrees, the largest drag torque reduction effect is obtained. That is, it is preferable to make the constant angle α of the symmetrical broadened portion 4 of the first groove 6b within a range of 20 to 70 degrees. It is more preferable to make the constant angle α of the symmetrical broadened portion 4 of the first groove 6b at about 45 degrees.

Next, in order to obtain an optimal value of the height or cut amount β, there were prepared nine samples having different heights β, while fixing the inclination angle α at 45 degrees and the proportion of the oil grooves 6a having the inner peripheral broadened portion at 50%. Then, the nine samples were assembled respectively in an actual AT and a drag torque reduction rate was measured for each of the samples. The drag torque reduction rate was expressed as an average value of six points of measurement values that are measured at every 500 rpm while increasing the rotating speed of the segment-type friction material 1 gradually from 500 rpm to 3000 rpm.

As a result, as shown in FIG. 3, in case the height β is 0.5 mm, the drag torque reduction rate is low such as about 12%. However, if the height becomes 1.0 mm, the rate jumps up to nearly 25%. Thereafter, if the height β increases, the rate increases. If the height β is 3.0 mm, the drag torque reduction rate becomes a largest value of about 60%. Thereafter, if the height β increases, the rate decreases slowly. In case the height β is 7.0 mm, the drag torque reduction rate is still kept at about 30%. However, if the height β becomes 8.0 mm, the rate immediately drops to 10% or less. Accordingly, in conclusion, if the height or the cut amount β is kept within a range of 1.0 mm to 7.0 mm, a significant drag torque reduction effect is obtained. The segment piece 3a, 3b has a height of 10 mm, so that a proportion of the height β is preferably kept within a range of 10% to 70% to the height of the segment piece. Particularly, if the height β is 3.0 mm or 30% in proportion, the largest drag torque reduction effect is obtained. That is, it is preferable to make the proportion of the height β of the symmetrical broadened portion 4 of the first oil groove 6b to the total height of the first oil groove 6b within a range of 10% to 70%. It is more preferable to make the proportion of the height β of the symmetrical broadened portion 4 of the first oil groove 6b to the total height of the first oil groove 6b at about 30%.

Next, in order to obtain an optimal value of the proportion of the oil grooves 6a having the inner peripheral broadened portions, there were prepared seven samples having different proportions of the oil grooves 6a having the inner peripheral broadened portions, while fixing the inclination angle α at 45 degrees and the height β at 3.0 mm. Then, the seven samples were assembled respectively in an actual AT and a drag torque reduction rate was measured for each of the samples. The drag torque reduction rate was expressed as an average value of six points of measurement values that are measured at every 500 rpm while increasing the rotating speed of the segment-type friction material 1 gradually from 500 rpm to 3000 rpm.

As a result, as shown in FIG. 4, in case the proportion of the oil grooves 6a having the inner peripheral broadened portions is 10%, the drag torque reduction rate is low such as about 15%. However, if the proportion of the oil grooves 6a having the inner peripheral broadened portions becomes 20%, the rate jumps up to nearly 40%. Thereafter, if the proportion of the oil grooves 6a having the inner peripheral broadened portions increases, the rate increases. If the proportion of the oil grooves 6a having the inner peripheral broadened portions is 50%, the drag torque reduction rate becomes a largest value of about 60%. Thereafter, if the proportion of the oil grooves 6a having the inner peripheral broadened portions increases, the rate decreases slowly. In case the proportion of the oil grooves 6a having the inner peripheral broadened portions is 80%, the drag torque reduction rate is still kept at about 40%. However, if the proportion of the oil grooves 6a having the inner peripheral broadened portions becomes 100%, the rate immediately drops to 10% or less. Accordingly, in conclusion, if the proportion of the oil grooves 6a having the inner peripheral broadened portions is kept within a range of 20% to 80%, a significant drag torque reduction effect is obtained. Particularly, if the proportion of the oil grooves 6a having the inner peripheral broadened portions is 50%, the largest drag torque reduction effect is obtained. That is, while the first grooves 6b and the second grooves 6a are mixedly disposed in a predetermined proportion, it is preferable to mixedly dispose the first oil grooves 6b and the second oil grooves 6a in the proportion within a range of 20%:80% to 80%:20%. It is more preferable to alternately dispose the first oil grooves 6b and the second oil grooves 6a in the proportion of 50% to 50%.

Figure 11:
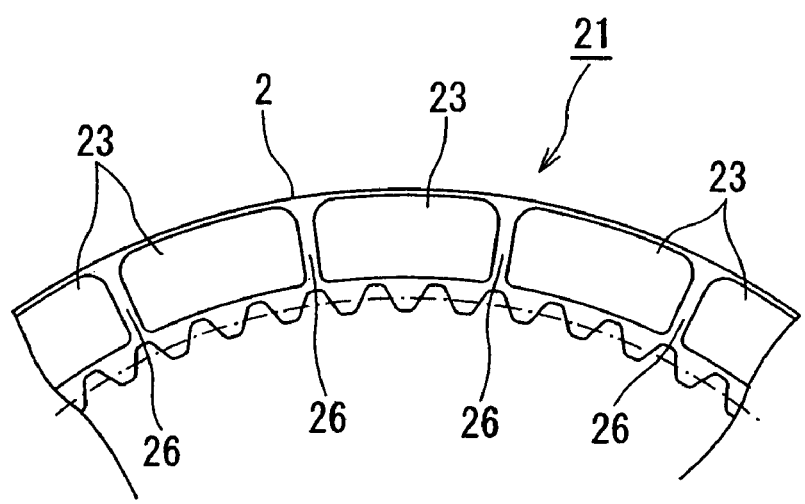
FIG. 11 is a plan view showing a partial structure of a conventional segment-type friction material.

As described above, the optimal values are obtained so as to manufacture the segment-type friction material 1 according to the first embodiment that has the inclination angle α of 45 degrees, the height β of 3.0 mm and the proportion of the oil grooves 6a having the inner peripheral broadened portions of 50%. Then, a relation between a relative rotating speed and a drag torque of the segment-type friction material was tested in comparison with the conventional segment-type friction material 21 shown in FIG. 11. Test conditions are as follows. The relative rotating speed is 500 to 3000 rpm, an oil temperature of ATF is 40° C., an oil amount of ATF is 1000 mL/min, a number of disc plates are three and a number of counterpart steel disc plates are four accordingly, and a back clearance is 0.25 mm per plate. Test results are shown in FIG. 5.

As shown in FIG. 5, there occurs a difference at the time of the relative rotating speed of 500 rpm, and the segment-type friction material 1 according to the first embodiment has a smaller drag torque. Then, the drag torque of the segment-type friction material 1 becomes smaller as the relative rotating speed increases. In contrast, the drag torque of the conventional segment-type friction material 21 becomes still larger, so that the difference becomes larger. Thereafter, the drag torque of the conventional segment-type friction material becomes smaller little by little. However, the drag torque of the conventional segment-type friction material 21 is about 0.45 N·m, while the drag torque of the first embodiment of the segment-type friction material 1 becomes nearly zero at the time of the relative rotating speed of 3000 rpm.

As described above, the first embodiment of the segment-type friction material 1 has a sufficient drag torque reduction effect even at a portion where the lubricating oil is in much amount or is hard to be discharged. Moreover, the segment pieces 3a, 3b can be made large so that they can be manufactured in a short period of time, thereby reducing costs. Furthermore, since a cut shape of the two facing sides 4, 4 of the segment pieces 3a, 3b is same, there is no need to replace a blade for clipping the facing two sides at the time of cutting out the segment pieces 3a, 3b from the friction material substrate. Therefore, a step for cutting out the segment pieces 3a, 3b requires a shorter period of time, thereby shortening a manufacturing process time of the segment-type friction material 1.

SECOND EMBODIMENT

Figure 6:
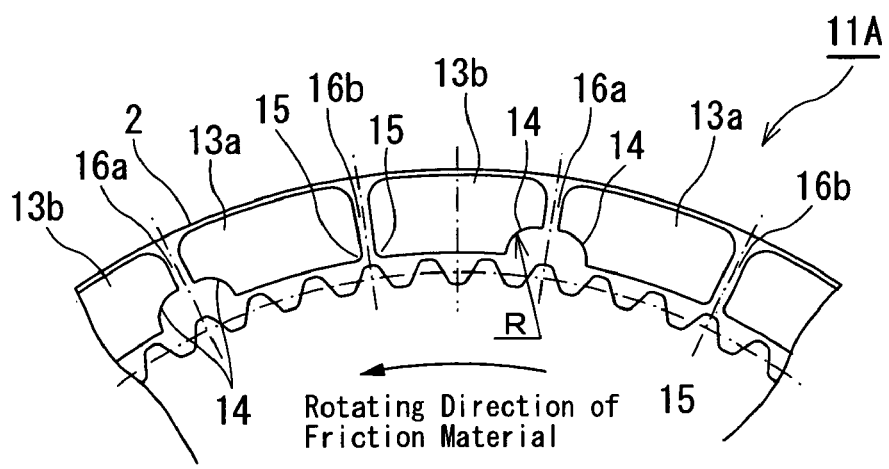
FIG. 6 is a plan view showing a part of a wet friction material according to a second embodiment of the invention.
Figure 7:
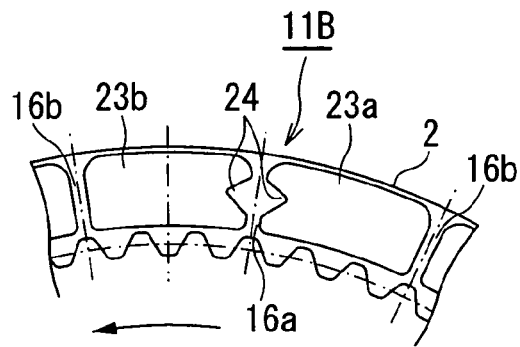
FIG. 7 is a plan view showing a part of a wet friction material according to a first modified example of the second embodiment of the invention.
Figure 8:
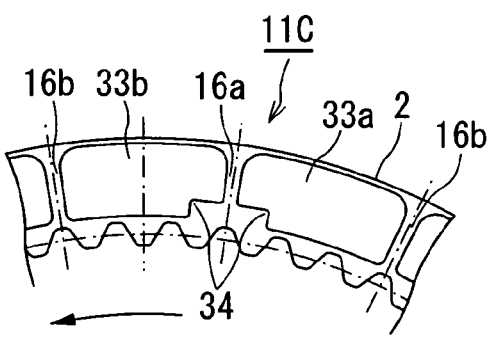
FIG. 8 is a plan view showing a part of a wet friction material according to a second modified example of the second embodiment of the invention.
Figure 9:
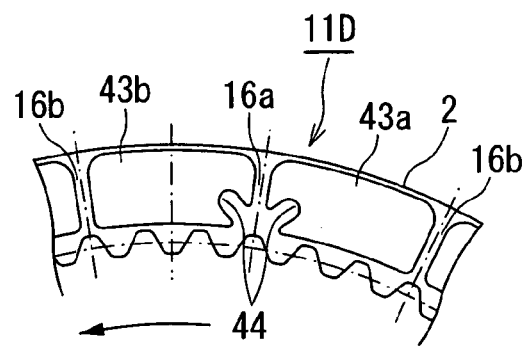
FIG. 9 is a plan view showing a part of a wet friction material according to a third modified example of the second embodiment of the invention.
Figure 10:
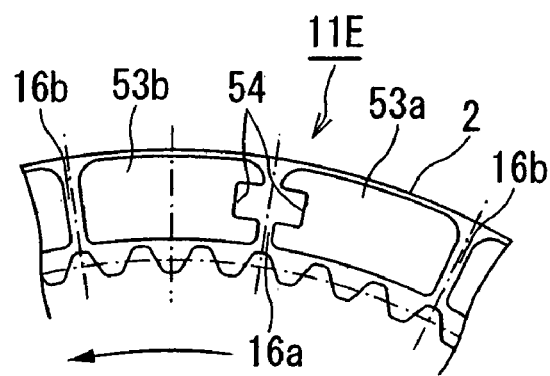
FIG. 10 is a plan view showing a part of a wet friction material according to a fourth modified example of the second embodiment of the invention.

Next, a wet friction material according to a second embodiment is described referring to FIG. 6 to FIG. 10. FIG. 6 is a plan view showing a part of a wet friction material according to a second embodiment of the invention. FIG. 7 is a plan view showing a part of a wet friction material according to a first modified example of the second embodiment of the invention. FIG. 8 is a plan view showing a part of a wet friction material according to a second modified example of the second embodiment of the invention. FIG. 9 is a plan view showing a part of a wet friction material according to a third modified example of the second embodiment of the invention. FIG. 10 is a plan view showing a part of a wet friction material according to a fourth modified example of the second embodiment of the invention.

As shown in FIG. 6, the second embodiment of the wet friction material is a segment-type friction material 11A, too. The segment-type friction material 11A is made by joining a plurality of segment pieces 13a, 13b on a front surface of a core metal 2 of a flat ring shape with a thermosetting resin adhesive while arranging them at an interval of an oil groove 16b. A plurality of the segment pieces 13a, 13b are joined on a rear surface of the core metal 2 in the same manner, too. An inner peripheral left corner of the segment piece 13a and an inner peripheral right corner of the segment piece 13b are respectively cut off along a curve or an arc having a radius R so as to be symmetrical to a center line of an oil groove 16a. Such corners constitute cut portions 14 and face to each other so as to form an inner peripheral broad portion. The segment pieces 13a, 13b are heat-pressed from opposite sides of the core metal 2 at 230° C. to 250° C. for 30 to 90 seconds so as to be secured on the core metal 2, thereby making the segment-type friction material 11A as a finished product.

In the segment-type friction material 11A, an inner peripheral right corner 15 of the segment piece 13a and an inner peripheral left corner 15 of the segment piece 13b are not cut off so that the oil groove 16b is formed to be an oil groove having a nearly uniform width. In contrast, the oil groove 16a becomes a wide oil groove having the inner peripheral corner portion 14 broadened or formed into a curved shape relative to the center line of the oil groove 16a. As shown in FIG. 6, the oil grooves 16a and the oil grooves 16b are disposed alternately in the same number. In case the segment-type friction material 11A is assembled in an automatic transmission (AT), when the friction material 11A rotates in an arrow direction in a disengaged state, an automatic transmission fluid (ATF) supplied from an inner circumference bumps or touches the portion 14 of the segment piece 13a that is broadened into the curved shape at a rear side in the rotating direction. Thus, ATF is positively supplied to a friction surface of the friction material substrate 13a so as to restrain contact of a separator plate and the friction surface, while an excess ATF is discharged from the oil groove 16b having nearly the same width.

Consequently, it is possible to obtain a significant drag torque suppressing effect. In case the segment-type friction material 11A is rotated in the reversed direction, the portion 14 of the segment piece 13b that is broadened into the curved shape at an opposite side to that of the segment piece 13a acts similarly.

As described above, the second embodiment of the segment-type friction material 11A has a sufficient drag torque reduction effect even at a portion where the lubricating oil is in much amount or is hard to be discharged. Moreover, the segment pieces 13a, 13b can be made large so that they can be manufactured in a short period of time, thereby reducing costs. Furthermore, since a cut shape of the two facing sides 14, 14 of the segment pieces 13a, 13b is same, there is no need to replace a blade for clipping the facing two curved portions at the time of cutting out the segment pieces 13a, 13b from the friction material substrate. Therefore, a step for cutting out the segment pieces 13a, 13b requires a shorter period of time, thereby shortening a manufacturing process time of the segment-type friction material 11A.

Modified Examples of Second Embodiment

Next, a segment-type friction material as a wet friction material according to a first modified example of the second embodiment is described referring to FIG. 7. As shown in FIG. 7, the first modified example of the second embodiment of the segment-type friction material 11B has no inner peripheral side of a segment piece cut off contrary to the segment-type friction material 1 or the segment-type friction material 11A described heretofore. Center portions or dents 24 in a radial direction of the segment piece 23a, 23b, which are faced to each other across the oil groove 16a, are respectively cut off in a symmetrical manner.

In case the segment pieces 23a, 23b have the center portions 24 or the broadened portions not at the inner peripheral side but at the center of the oil groove 16a, similar effects are obtained. That is, in case the segment-type friction material 11B is assembled in an automatic transmission (AT), when the friction material 11B rotates in an arrow direction in a disengaged state, an automatic transmission fluid (ATF) supplied from an inner circumference bumps or touches the portion 24 of the segment piece 23a that is broadened into a V-shape at a rear side in the rotating direction. Thus, ATF is positively supplied to a friction surface of the friction material substrate 23a so as to restrain contact of a separator plate and the friction surface, while an excess ATF is discharged from the oil groove 16b having nearly the same width.

Consequently, it is possible to obtain a significant drag torque suppressing effect. In case the segment-type friction material 11B is rotated in the reversed direction, the portion 24 of the segment piece 23b that is broadened into the V-shape at an opposite side to that of the segment piece 23a acts similarly.

Next, a segment-type friction material as a wet friction material according to a second modified example of the second embodiment is described referring to FIG. 8. As shown in FIG. 8, in the second modified example of the second embodiment of the segment-type friction material 11C, inner peripheral sides or portions 34 of segment pieces 33a, 33b are cut off into a rectangular shape. Accordingly, when the friction material 11C rotates in an arrow direction in a disengaged state, an automatic transmission fluid (ATF) supplied from an inner circumference bumps or touches the portion or rectangular portions 34 of the segment piece 33a that is broadened into a rectangular shape at a rear side in the rotating direction. Thus, ATF is positively supplied to a friction surface of the friction material substrate 33a so as to restrain contact of a separator plate and the friction surface, while an excess ATF is discharged from the oil groove 16b having nearly the same width.

Consequently, it is possible to obtain a significant drag torque suppressing effect. In case the segment-type friction material 11C is rotated in the reversed direction, the portion 34 of the segment piece 33b that is broadened into the rectangular shape at an opposite side to that of the segment piece 33a acts similarly.

Next, a segment-type friction material as a wet friction material according to a third modified example of the second embodiment is described referring to FIG. 9. As shown in FIG. 9, in the third modified example of the second embodiment of the segment-type friction material 11D, inner peripheral sides or portions 44 of segment pieces 43a, 43b are cut off into a semi-elliptical or semi-oval shape extending at an angle. Accordingly, when the friction material 11D rotates in an arrow direction in a disengaged state, an automatic transmission fluid (ATF) supplied from an inner circumference bumps or touches the portion or semi-oval portions 44 of the segment piece 43a that is broadened into a semi-oval shape at a rear side in the rotating direction. Thus, ATF is positively supplied to a friction surface of the friction material substrate 43a so as to restrain contact of a separator plate and the friction surface, while an excess ATF is discharged from the oil groove 16b having nearly the same width.

Consequently, it is possible to obtain a significant drag torque suppressing effect. In case the segment-type friction material 11D is rotated in the reversed direction, the portion 44 of the segment piece 43b that is broadened into the semi-oval shape at an opposite side to that of the segment piece 43a acts similarly.

Next, a segment-type friction material as a wet friction material according to a fourth modified example of the second embodiment is described referring to FIG. 10. As shown in FIG. 10, in the fourth modified example of the second embodiment of the segment-type friction material 11E, center portions of segment pieces 53a, 53b are cut off into a rectangular shape. Accordingly, when the friction material 11E rotates in an arrow direction in a disengaged state, an automatic transmission fluid (ATF) supplied from an inner circumference bumps or touches the portion or the rectangular portions 54 of the segment piece 53a that is broadened into a rectangular shape at a rear side in the rotating direction. Thus, ATF is positively supplied to a friction surface of the friction material substrate 53a so as to restrain contact of a separator plate and the friction surface, while an excess ATF is discharged from the oil groove 16b having nearly the same width.

Consequently, it is possible to obtain a significant drag torque suppressing effect. In case the segment-type friction material 11E is rotated in the reversed direction, the portion 54 of the segment piece 53b that is broadened into the rectangular shape at an opposite side to that of the segment piece 53a acts similarly.

In each of the above embodiments, the segment-type friction material is described as an example of the wet friction material. However, each of the above embodiments has similar function and effects if embodied in a press-type friction material.

In practicing the invention, it is not limited to each of the above embodiments with respect to a structure, a shape, a number, a material, a dimension, a connecting relation or the like of other portions of the wet friction material.

The preferred embodiments described herein are illustrative and not restrictive, the scope of the invention being indicated in the appended claims and all variations which come within the meaning of the claims are intended to be embraced therein.

The invention claimed is:

1. A segment-type wet friction material comprising:
a core metal of a flat ring plate shape; and
segment pieces made of friction material substrates cut into a segment piece shape along a circumference of the flat ring plate shape of the core metal, the segment pieces being joined on at least one surface of the core metal with an adhesive along the entire circumference of the core metal so that a plurality of oil grooves extending in a radial direction of the core metal are formed by a clearance between adjacent ones of the segment pieces, the plurality of the oil grooves being composed of first oil grooves and second oil grooves, each of the first oil grooves having a symmetrical broadened portion at one of an inner peripheral opening portion and a center portion thereof in the radial direction of the core metal, each of the second grooves having nearly a uniform width from an inner peripheral opening portion to an outer peripheral opening portion, the first grooves and the second grooves being mixedly disposed in a predetermined proportion,
wherein the symmetrical broadened portion of the first oil groove is formed by a pair of oblique lines located at the inner peripheral opening portion so as to be symmetrically broadened and inclined at a constant angle to a center line of the first oil groove.

2. A segment-type wet friction material according to claim 1 in which the first oil grooves and the second oil grooves are mixedly disposed in a proportion within a range of 20%:80% to 80%:20% as the predetermined proportion.

3. A segment-type wet friction material according to claim 2 in which the first oil grooves and the second oil grooves are alternately disposed in a proportion within 50% to 50% as the predetermined proportion.

4. A segment-type wet friction material according to claim 1 in which the constant angle is within a range of 20 to 70 degrees.

5. A segment-type wet friction material according to claim 4 in which the constant angle is about 45 degrees.

6. A segment-type wet friction material according to claim 1 in which a proportion of a height of the symmetrical broadened portion of the first oil groove to a total height of the first oil groove is within a range of 10% to 70%.

7. A segment-type wet friction material according to claim 6 in which a proportion of the height of the symmetrical broadened portion of the first oil groove to the total height of the first oil groove is about 30%.

8. A press-type wet friction material comprising:
a core metal of a flat ring plate shape; and
a friction material substrate joined on at least one surface of the core metal with an adhesive along an entire circumference of the core metal, the friction material substrate being pressed so that a plurality of oil grooves extending in a radial direction of the core metal are formed, the plurality of the oil grooves being composed of first oil grooves and second oil grooves, each of the first oil grooves extends through the entire friction material substrate in a radial direction of the core metal and having a symmetrical broadened portion at one of an inner peripheral opening portion and a center portion thereof in the radial direction of the core metal, each of the second grooves having nearly a uniform width from an inner peripheral opening portion to an outer peripheral opening portion, the first grooves and the second grooves being mixedly disposed in a predetermined proportion,
wherein the symmetrical broadened portion of the first oil groove is formed by a pair of oblique lines located at the inner peripheral opening portion so as to be symmetrically broadened and inclined at a constant angle to a center line of the first oil groove.

9. A segment-type wet friction material comprising:
a core metal of a flat ring plate shape; and
segment pieces made of friction material substrates cut into a segment piece shape along a circumference of the flat ring plate shape of the core metal, the segment pieces being joined on at least one surface of the core metal with an adhesive along the entire circumference of the core metal so that a plurality of oil grooves extending in a radial direction of the core metal are formed by a clearance between adjacent ones of the segment pieces, the plurality of the oil grooves being composed of first oil grooves and second oil grooves, each of the first oil grooves having a symmetrical broadened portion at one of an inner peripheral opening portion and a center portion thereof in the radial direction of the core metal, each of the second grooves having nearly a uniform width from an inner peripheral opening portion to an outer peripheral opening portion, the first grooves and the second grooves being mixedly disposed in a predetermined proportion,
wherein the symmetrical broadened portion of the first oil groove is formed by a pair of semi-ovals located at the inner peripheral opening portion so as to be symmetrically broadened about a center line of the first oil groove, each of the semi-ovals extending obliquely with respect to the center line of the first oil groove.

10. A segment-type wet friction material comprising:
a core metal of a flat ring plate shape; and
segment pieces made of friction material substrates cut into a segment piece shape along a circumference of the flat ring plate shape of the core metal, the segment pieces being joined on at least one surface of the core metal with an adhesive along the entire circumference of the core metal so that a plurality of oil grooves extending in a radial direction of the core metal are formed by a clearance between adjacent ones of the segment pieces, the plurality of the oil grooves being composed of first oil grooves and second oil grooves, each of the first oil grooves having a symmetrical broadened portion at one of an inner peripheral opening portion and a center portion thereof in the radial direction of the core metal, each of the second grooves having nearly a uniform width from an inner peripheral opening portion to an outer peripheral opening portion, the first grooves and the second grooves being mixedly disposed in a predetermined proportion, wherein the symmetrical broadened portion of the first oil groove is formed only by a pair of arcs located at the inner peripheral opening portion so as to be symmetrically broadened about a center line of the first oil groove.

* * * * *